(12) United States Patent
Gist et al.

(10) Patent No.: US 8,701,435 B2
(45) Date of Patent: Apr. 22, 2014

(54) MULTIPLE BARREL FROZEN PRODUCT DISPENSER

(75) Inventors: David B. Gist, Grayslake, IL (US); Kyle B. Elsom, Batavia, IL (US); Gregory M. Billman, Hoffman Estates, IL (US); Nikolay Popov, Warrenville, IL (US); Santhosh Kumar, Woodridge, IL (US); Daniel C. Leaver, Westmont, IL (US)

(73) Assignee: IMI Cornelius, Inc., Glendale Heights, IL (US)

( * ) Notice: Subject to any disclaimer, the term of this patent is extended or adjusted under 35 U.S.C. 154(b) by 358 days.

(21) Appl. No.: 12/930,733

(22) Filed: Jan. 14, 2011

(65) Prior Publication Data

US 2011/0162407 A1    Jul. 7, 2011

Related U.S. Application Data

(63) Continuation of application No. 11/803,264, filed on May 14, 2007, now abandoned.

(60) Provisional application No. 60/799,818, filed on May 12, 2006.

(51) Int. Cl.
*A23G 9/00* (2006.01)

(52) U.S. Cl.
USPC ............... 62/342; 62/510; 62/394; 62/68

(58) Field of Classification Search
USPC ............... 62/342, 343, 510, 394, 392, 68–70; 99/455
See application file for complete search history.

(56) References Cited

U.S. PATENT DOCUMENTS

| | | | | |
|---|---|---|---|---|
| 5,065,591 A | * | 11/1991 | Shaw | 62/175 |
| 5,159,818 A | * | 11/1992 | Etou et al. | 62/137 |
| 2003/0150236 A1 | * | 8/2003 | Ross et al. | 62/342 |
| 2004/0187514 A1 | * | 9/2004 | Franck et al. | 62/352 |

* cited by examiner

*Primary Examiner* — Cassey D Bauer
(74) *Attorney, Agent, or Firm* — Niro, Haller & Niro

(57) ABSTRACT

A frozen product dispenser is characterized by at least two product freeze barrels for receiving product therein and for freezing the product for dispensing, and a refrigeration system for chilling the at least two barrels. The refrigeration system has at least two evaporators for and heat transfer coupled to each barrel, separate and controllable expansion valves each having an outlet coupled to an inlet to an inlet to an associated one of the evaporators, at least two compressors having outlets coupled to inlets to the expansion valves and inlets coupled to outlets from the evaporators, and at least one condenser in fluid circuit between outlets from the compressors and inlets to the expansion valves. The refrigeration system is controllable to selectively operate one or more of the compressors and one or more of the expansion valves in accordance with the cooling requirements of the barrels to provide an improved turndown ratio for improvements in efficiency of operation of the refrigeration system in response to changing cooling load requirements of the product barrels.

11 Claims, 4 Drawing Sheets

MULTIPLE BARREL FROZEN PRODUCT DISPENSER

This application is a continuation of application Ser. No. 11/803,264, filed May 14, 2007 and now abandoned, which claimed benefit of provisional application Ser. No. 60/799,818, filed May 12, 2006.

FIELD OF THE INVENTION

The present invention relates to frozen product dispensers, and in particular to a frozen product dispenser having an improved refrigeration system that efficiently handles large variations in cooling load demands of a plurality of frozen product barrels of the dispenser.

BACKGROUND OF THE INVENTION

The load requirements of frozen beverage product dispensers are highly variable, since customer demand for beverages can vary from no drinks dispensed per minute to as many as 3 or 4 or more drinks served per minute. This volatile variation in customer demand results in a very broad range of cooling load requirements for a typical frozen product dispenser, such for example as is shown by the chart of FIG. 2. As can be seen, depending upon ambient temperature and during periods when no product is being drawn, the maintenance cooling load of a frozen product dispenser can be as low as 1500 Btu/hr. At the other extreme and during periods of high drink draw rates, for example when delivering drinks at the rate of 4×16 oz drinks per minute, cooling load requirements of a frozen product dispenser can be on the order of 18,000 Btu/hr. This represents a 12:1 turndown ratio, which from an energy standpoint conventional refrigeration systems are not able to efficiently accommodate.

As is known, conventional frozen product dispensers utilize a compressor that delivers refrigerant through a condenser to one or more expansion valves, each of controls delivery of refrigerant to an associated evaporator cooling coil that is thermally coupled to an associated product barrel in order to chill the product barrel to freeze product in the barrel. To accommodate various cooling load requirements of the product barrels, the expansion valves advantageously are variably controlled, such that as load requirements for an evaporator coil change due to changing customer demands, the expansion valve supplying refrigerant to the evaporator changes to a more appropriate refrigerant flow metering position. The idea is to adjust the expansion valve so as to match the cooling capability of the evaporator, based upon refrigerant flow to the evaporator, more closely to the dynamically changing cooling load requirements of the product barrel that is being chilled by the evaporator. However, fixed speed compressors of a type normally used for frozen product dispensers are not readily able to accommodate changes in cooling load requirements and are best suited to provide refrigerant flow at a certain rate, despite changes in the cooling load. Refrigeration system balance therefore becomes disturbed as the expansion valves are adjusted to meet changing cooling load requirements, resulting in saturated evaporator temperature dropping as cooling load requirements decrease, rising as cooling load requirements increase, and generally poor control over the temperature of the evaporator. In addition, when cooling load requirements decrease, cooling of product in the barrel is quickly satisfied and the compressor must be cycled off. In consequence, where the compressor is not matched with the cooling load, during periods of low product demand the compressor will cycle on/off excessively and the system will operate less efficiently and use more energy than would otherwise be required.

Various known design strategies can be employed to better balance the refrigeration system of frozen product dispensers. One such strategy contemplates using hot-gas bypass to create a "false load" for the compressor, but often there are reasons involving cost and/or complexity of design that rule out using a hot-gas bypass technique. Another strategy involves modulation of compressor pumping capacity to better match compressor cooling capacity to the actual cooling load requirements of the product barrels, but while compressor modulation can be provided by mechanical means in larger capacity compressors, doing so can be cost prohibitive when using smaller compressors of a size as are usually employed in frozen product dispensers.

OBJECT OF THE INVENTION

A primary object of the present invention is to provide a frozen product dispenser having an improved refrigeration system that chills, and efficiently handles large variations in cooling load demands of a plurality of, frozen product barrels.

SUMMARY OF THE INVENTION

In accordance with the present invention, there is provided a frozen product dispenser comprising a plurality of product freeze barrels for receiving liquid product and freezing the product for dispensing; and a refrigeration system for chilling the plurality of barrels to freeze liquid therein. The refrigeration system includes a plurality of evaporators, each heat transfer coupled to a respective one of the barrels; a plurality of variably controllable expansion valves each fluid coupled at an inlet to an inlet to an associated evaporator; at least two compressors having inlets fluid coupled to outlets from each evaporator; and at least one condenser in fluid circuit between outlets from the at least two compressors and inlets to the expansion valves.

In a contemplated embodiment of the invention, the plurality of product freeze barrels is two barrels, the plurality of evaporators is two evaporators, the at least two compressors are two compressors and the at least one condenser is one condenser, and further included is a control system for controlling operation of the compressors and expansion valves.

The invention also contemplates a method of making a frozen product, which comprises the steps of providing a plurality of product freeze barrels; introducing liquid product into the plurality of barrels; and chilling the plurality of barrels to freeze product therein. The chilling step comprises heat transfer coupling plurality of evaporators to each barrel; providing a separate and variably controllable expansion valve at an inlet to each evaporator; and providing refrigerant from at least two compressors through at least one condenser and the expansion valves to the evaporators to chill the plurality of barrels.

In a contemplated practice of the method, the providing step provides two product freeze barrels, the heat transfer coupling step comprises heat transfer coupling two evaporators to each barrel, the providing refrigerant step comprises providing refrigerant from two compressors through one condenser and the expansion valves to the evaporators, and included is the step of controlling operation of the compressors and the expansion valves.

The foregoing and other objects, advantages and features of the invention will become apparent upon a consideration of

DETAILED DESCRIPTION

The Prior Art

Figure 1:
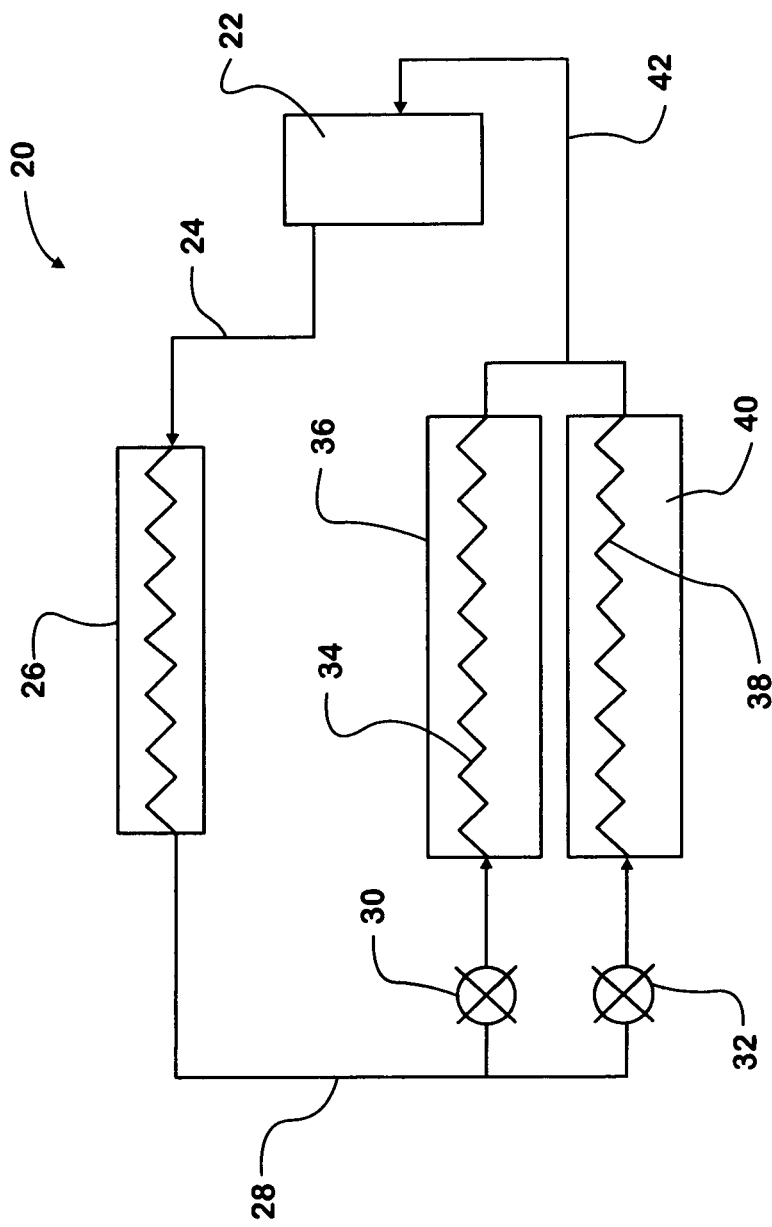
FIG. 1 is a schematic representation of a refrigeration system for a conventional frozen product dispenser.

FIG. 1 shows a known type of refrigeration system, indicated generally at 20, for use in chilling product freeze barrels of a frozen product dispenser. The refrigeration system has a fixed speed compressor 22 that delivers hot refrigerant from its outlet through a line 24 to an inlet to a condenser 26 for cooling of the refrigerant. Upon leaving the condenser, the cooled refrigerant flows through a line 28 to inlets to each of a pair of variably controlled expansion valves 30 and 32. The expansion valve 30 adjustably meters refrigerant to an evaporator 34 heat transfer coupled to a product freeze barrel 36 to chill the barrel and freeze product in it. The expansion valve 32 adjustably meters refrigerant to an evaporator 38 heat transfer coupled to a product freeze barrel 40 to chill barrel and freeze product in it. Refrigerant exiting the evaporators 34 and 38 flows through a suction line 42 to an inlet to the compressor 22. Liquid product components, which may be beverage components, are introduced into the freeze barrels 36 and 40 in any conventional manner well understood in the art, and within the barrels the product is chilled and acted upon by a scraper assembly to provide frozen product for dispensing from the barrels and service to customers.

Figure 2:
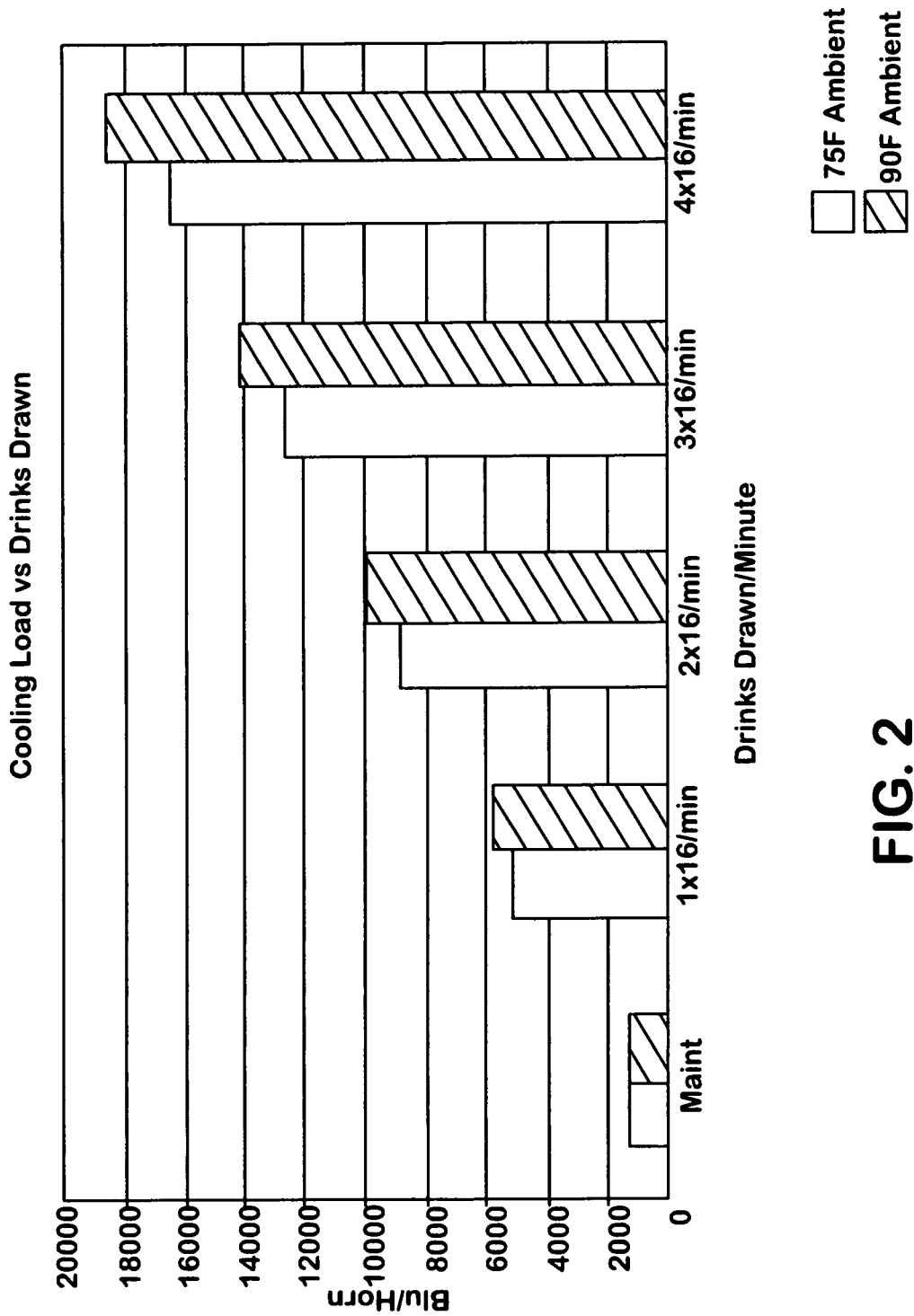
FIG. 2 is a chart showing representative ranges of cooling load requirements for a refrigeration system of a frozen product dispenser, based upon customer demand for product from the dispenser.

FIG. 2 shows the large variations in cooling load requirements that the refrigeration system 20 must satisfy when customer demand for frozen product ranges from no frozen product being served for a period of time to as many as 3 or 4 or more frozen products being served per minute. During periods of no product being drawn, maintenance cooling load requirements for the refrigeration system 20 can be as low as 1500 Btu/hr, while during periods of high frozen product draw rates, cooling requirement can be on the order of 18,000 Btu/hr. That represents a 12:1 turndown ratio, which the conventional refrigeration system 20 is not well equipped to efficiently handle. As cooling load requirements change due to volatile customer demand for frozen product, the expansion valves 30 and 32 are controlled in an attempt to provide appropriate refrigerant flows to the product barrel evaporators 34 and 38. An effort is made to control the expansion valves 30 and 32 so as to match the cooling capability of their associated evaporators 34 and 38 to the dynamically changing cooling load requirements of the product freeze barrels 36 and 40. However, for efficient operation the fixed speed compressor 22 requires refrigerant flow at a relatively constant rate, so when refrigerant flows are changed to meet changing cooling load requirements, refrigeration system balance becomes disturbed and saturated evaporator temperatures drop as loads drop and rise as loads rise, yielding poor control over evaporator temperature. Also, when cooling load requirements decrease, cooling of product in the freeze barrels 36 and 40 is quickly satisfied and the compressor 22 must be cycled off, so that during periods of low product demand the compressor cycles on/off excessively. The result is that during periods where the compressor 22 is not reasonably well matched with the cooling load requirements of the product barrels, the refrigeration system will operate less efficiently and use more energy than would otherwise be required.

The Invention

Figure 3:
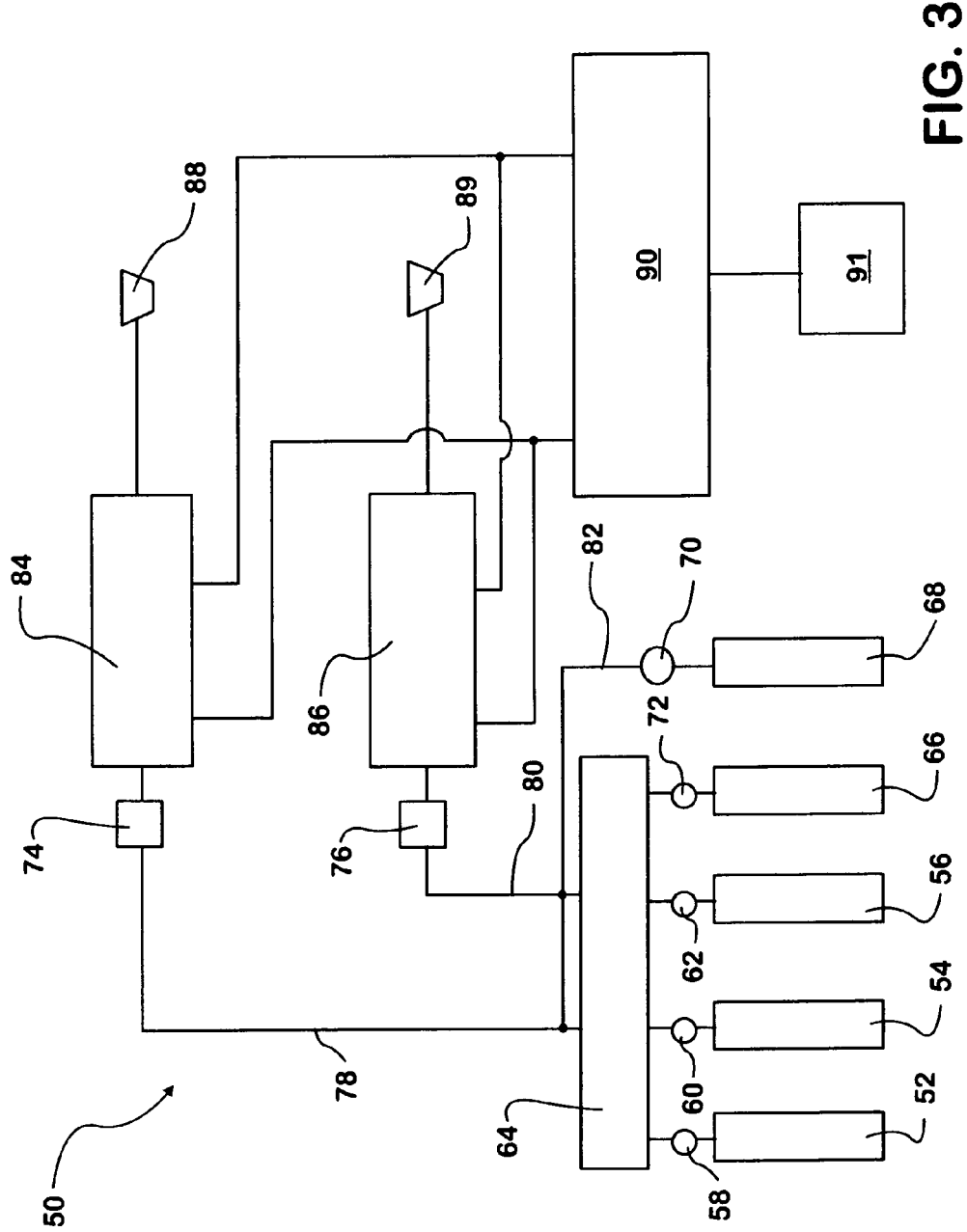
FIG. 3 is a schematic representation of a frozen product dispenser with which an improved refrigeration system embodying the teachings of the present invention may advantageously be used.

FIG. 3 shows a frozen product dispenser, indicated generally at 50, with which a refrigeration system embodying the teachings of the present invention may advantageously be used. The dispenser is for preparing a frozen beverage product for service to customers and that may be, by way of example, a frozen carbonated beverage (FCB), such as a carbonated soft drink or the like, and the dispenser will be described in the context of dispensing such a beverage. It is to be understood, however, that the dispenser can just as readily be used to dispense non-carbonated beverages.

The dispenser 50 is fluid coupled to a number of separate beverage component sources that may include first, second and third beverage syrup or flavor concentrate sources 52, 54 and 56, each of which may be a different flavor or brand of syrup or flavor concentrate. Each beverage component source 52, 54 and 56 may be individually supplied in a suitable container, such as in a bag-in-box or syrup tank, and has its output fluid coupled through an associated one of three flow metering device, such as metering pumps 58, 60 and 62, to a flow control device 64 that delivers the beverage components to frozen product barrels of the dispenser 50. The dispenser may also be fluid coupled to a source of water 66, such as potable water from a city main, as well as to a source of carbon dioxide gas 68 through a pressure regulator 70. The water source 66 is fluid coupled to the flow control device 64 through a metering pump 72 or other suitable flow metering device, whereby along with the metering devices 58, 60 and 62, selected ratios of water and beverage syrup(s) may be delivered to the flow control device 64.

Fluid outputs from the flow control device 64 are coupled to a plurality of expansion chambers 74 and 76 through fluid lines 78 and 80, each of which fluid line is for delivering beverage components to an associated product freeze barrel. The output from the $CO_2$ regulator 70 is connected via a fluid line 82 with the fluid lines 78 and 80 to enable the introduction of $CO_2$ gas into the beverage component fluid flows delivered into the lines 78 and 80 by the flow control device 64. The expansion chambers 74 and 76 are each fluid coupled to an inlet to an associated one of a plurality of freeze barrels 84 and 86 into which are delivered beverage components through associated fluid lines 78 and 80, and the expansion chambers operate in a well known manner to receive beverage product from their associated freeze barrels as the product expands in the barrels upon freezing. The expansion chambers may be of conventional design, and while the $CO_2$ and water are shown as being separately delivered into the fluid lines 78 and 80, if desired a conventional carbonator tank can be employed to carbonate the water with $CO_2$ for metered introduction into the flow control device 64. It is understood that while only two expansion chambers 74 and 76 and two product freeze barrels 84 and 86 are shown for convenience in describing the invention, a greater number of associated pairs of expansion chambers and freeze barrels may be used in practice of the invention, as will become apparent. As will be described in greater detail, the freeze barrels are encircled by and in heat transfer contact with evaporator circuits that chill the barrels to freeze beverage product components delivered into the barrels. It is also understood that while not specifically shown, electric motor driven scraper assemblies are provided for each freeze barrel to scrape frozen product off of the interior surfaces of the barrels for dispensing from associated product dispensing nozzles 88 and 89, and that the current draw of each electric motor is in accordance with the torque required to turn its scraper in its associated barrel and, therefore, that the current draw of the motor is representative of the state to which product its barrel is frozen. To the extent described, the frozen product dispenser 50 is generally conventional.

According to the invention, in improving upon conventional frozen product dispensers, the dispenser 50 utilizes a novel refrigeration system for chilling the product freeze barrels 84 and 86 in an efficient manner, even upon the occurrence of large variations in cooling load demands placed upon it by the barrels in response to significant and volatile changes in customer demand for frozen beverage products. As will be described, in the refrigeration system of the invention, and as compared to a conventional refrigeration system (see FIG. 1) in which each individual product freeze barrel is chilled by a single separate associated evaporator, there are instead at least two or more evaporators associated with and heat transfer coupled to each freeze barrel. Also, as compared to a conventional refrigeration system where a single compressor supplies refrigerant to all of the evaporators, in the refrigeration system of the invention there are at least two or more compressors that are matched in capacity to and supply refrigerant to all of the evaporators. For example, in one contemplated practice of the invention, two evaporator circuits are provided for each of two freeze barrels and two compressors are used to supply refrigerant to all of the evaporators, and depending upon the cooling requirements of the barrels, one evaporator circuit for each barrel and one compressor can be shut down, while the remaining evaporator circuits and single compressor remain active, such that cooling capacity drops by 50% and the turndown ratio for each evaporator circuit is effectively reduced to 6:1. Should freeze barrel cooling requirements further decrease, additional evaporator circuits can be shut down, if and as required, and for very low cooling requirements both evaporators for one barrel and one evaporator for the other barrel can be shut down, in which case one of the compressors can be turned off with the remaining compressor then supplying refrigerant to the single active evaporator being used to chill the other barrel. To further reduce the turndown ratio, it is contemplated that the number of evaporator circuits per freeze barrel be increased to more than two and also that the number of compressors be increased to more than two.

Figure 4:
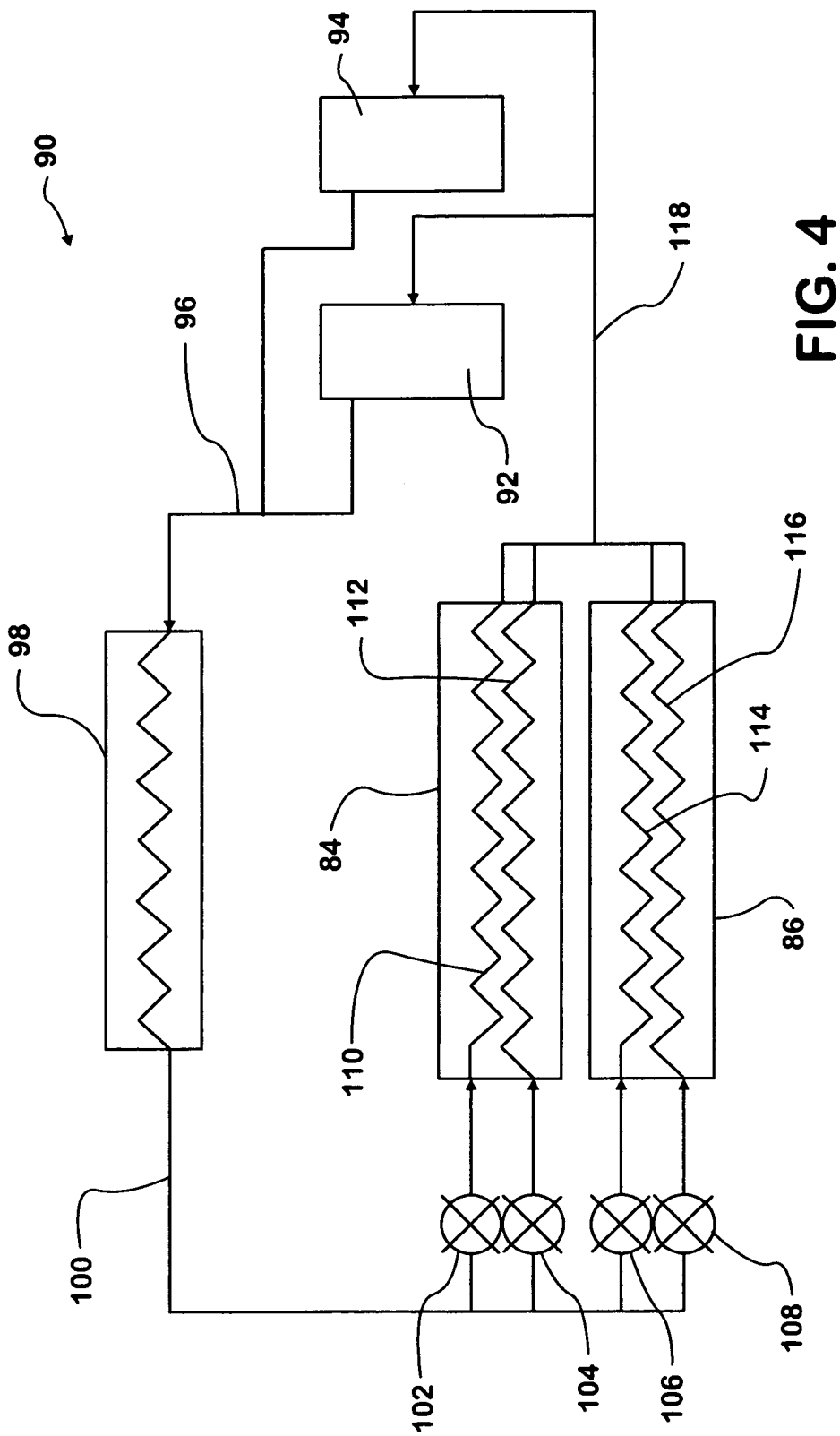
FIG. 4 is a schematic representation of one embodiment of refrigeration system according to the present invention.

One embodiment of refrigeration system contemplated by the invention for chilling the two freeze barrels 84 and 86 is shown in FIG. 4 and indicated generally at 90. The refrigeration system is operated by a control system 91 that is connected to sense or receive various operating parameters of the system, such for example as refrigerant temperature and pressure at various points in the system, as well as the amperage draw of the electric motors for the scraper assemblies of the freeze barrels, which represents the state to which product in the barrels is frozen. In response to sensing such parameters, the control system 91 operates the refrigeration system 90 to chill the freeze barrels 84 and 86 with an improved efficiency not obtainable with conventional refrigeration systems.

The refrigeration system 90 includes two compressors 92 and 94, each of which may be either a fixed or variable speed compressor sized to have about one-half the capacity of a single compressor as would customarily be used in a conventional refrigeration system (see FIG. 1) to chill the two freeze barrels using only one evaporator per barrel. An outlet from each compressor is coupled through a refrigerant line 96 to an inlet to a condenser 98, and cooled refrigerant at an outlet from the condenser is coupled through a refrigerant line 100 to inlets to each of four electronically controlled expansion valves 102, 104, 106 and 108. A pair of evaporator circuits 110 and 112 is wrapped around and heat transfer coupled to the product freeze barrel 84, and each evaporator is sized to have about one-half of the cooling capacity of a single evaporator as would normally be wrapped around the barrel if a conventional refrigeration system were used to chill the barrel. Similarly, a pair of evaporator circuits 114 and 116 is wrapped around and heat transfer coupled to the freeze barrel 86, and each evaporator is sized to have about one-half of the cooling capacity of a single evaporator as would normally be wrapped around the barrel if a conventional refrigeration system were used to chill the barrel. An outlet from the expansion valve 102 is coupled to an inlet to the evaporator 110 and an outlet from the expansion valve 104 is coupled to an inlet to the evaporator coil 112, whereby the settings of the expansion valves 102 and 104 can be adjusted to control the metering rate of refrigerant to the evaporators 110 and 112, and thereby the degree of chilling of the freeze barrel 84. Similarly, an outlet from the expansion valve 106 is coupled to an inlet to the evaporator coil 114 and an outlet from the expansion valve 108 is coupled to an inlet to the evaporator coil 116, whereby the settings of the expansion valves 106 and 108 can be adjusted to control the metering rate of refrigerant to the evaporators 114 and 116, and thereby the degree of chilling of the freeze barrel 86. Outlets from the evaporators 110, 112, 114 and 116 are fluid coupled through a refrigerant return line 118 to inlets to the compressors 92 and 94. The control system 91 controls operation of the compressors 92 and 94 and of the expansion valves 102, 104, 106 and 108, in accordance with the chilling requirements of the freeze barrels 84 and 86.

As compared to the conventional refrigeration system 20 of FIG. 1, the novel refrigeration system 90 of FIG. 4 provides specific advantages in efficiency of operation upon occurrence of changes in cooling load requirements of the product freeze barrels 84 and 86. These changes in cooling load requirements may be, as mentioned, determined by the sensed amperage draw of the electric motors for the freeze barrel scraper assemblies. In this connection, the amperage draws of the scraper assembly motors are related to the viscosity of the product in the freeze barrels, such that the greater the viscosity of the product, the more power is required to turn the scraper assemblies and the greater the amperage draw of the motors. In turn, the viscosity of the product in the barrels is related to the state to which the product is frozen, and the more frozen the product, the greater its viscosity. Amperage draw of the electric motors is therefore representative of and can be used to determine the state to which product in the freeze barrels is frozen.

As an example of how the refrigeration system of the invention operates more efficiently in chilling freeze barrels of a frozen product machine, it is understood that in the conventional refrigeration system 20 of FIG. 1, the fixed speed compressor 22 is matched to the pair of evaporators 34 and 38, and runs whenever chilling is required, which occurs when either both of the barrels 36 and 40 require chilling or when just one barrel is to be chilled. The conventional system, when cooling, therefore operates at either 100% or 50% of capacity, and therefore has a turndown ratio of 12:1.

On the other hand, in operation of the novel refrigeration system 90 of the invention, when the system is operating at 100% of cooling capacity, both compressors 92 and 94 are running and all of the expansion valves 102, 104, 106 and 108 are open to provide refrigerant flows to their associated evaporators 110, 112, 114 and 116 to chill the freeze barrels 84 and 86. However, should cooling load requirements of the barrels 84 and 86 decrease, such that 100% of cooling capacity is not required, one of the compressors 92 and 94 can be shut down and one of the expansion valves closed, so that the system then operates at 50% capacity, with the one running compressor providing refrigerant through three open expansion valves to their associated evaporators. Should cooling load requirements continue to decrease, two additional expansion valves can sequentially be closed until there no longer is a cooling load to be met and the second compressor is shut off. Each separate refrigeration circuit of FIG. 4 therefore has a turndown ratio of 6:1. Thus, for equal maximum cooling capacities of the conventional FIG. 1 refrigeration system 20 and of the FIG. 4 refrigeration system 90 that embodies the teachings of the invention, the refrigeration system 90 will operate with increased efficiency and, for equal cooling loads, will use less energy in satisfying the cooling requirements of the freeze barrels. Also, because the compressors 92 and 94 of the FIG. 4 refrigeration system are of reduced capacity, for low cooling load requirements less on/off cycling of the compressors is required, for further improved efficiency and decreased compressor wear.

It is to be appreciated that the FIG. 4 refrigeration system 90 represents just one possible embodiment of refrigeration system according to the teachings of the invention, and that other embodiments within the scope of the invention will be apparent to those skilled in the art. For example, the invention is not limited to using a refrigeration system to chill just two freeze barrels 84 and 86, and more than two barrels of a frozen product dispenser may be chilled. Should a frozen product dispenser have four freeze barrels, a refrigeration system embodying the invention could have two or more compressors, such as four compressors, along with eight adjustably controllable expansion valves, each for metering refrigerant to an associated one of eight evaporators, where two evaporators are provided for chilling each of the four freeze barrels. It is also contemplated that to further increase the turndown ratio of a refrigeration system, more than two evaporator circuits and associated expansion valves can be provided for each freeze barrel, such for example as three or more evaporator circuits and associated expansion valves for each product barrel.

While embodiments of the invention have been described in detail, various modifications and other embodiments thereof may be devised by one skilled in the art without departing from the spirit and scope of the invention, as defined in the appended claims.

What is claimed is:

1. A frozen product dispenser, comprising:
   at least two product freeze barrels for receiving and chilling product for dispensing;
   a refrigeration system for chilling said at least two freeze barrels, said refrigeration system including a plurality of evaporators heat transfer coupled to associated ones of said at least two freeze barrels with at least two evaporators heat transfer coupled to each freeze barrel for chilling said barrels, a plurality of controllable expansion valves each having an outlet coupled to an inlet to an associated one of said evaporators, at least two compressors connected in parallel and having inlets coupled to outlets from said evaporators, and at least one condenser coupled between outlets from said at least two compressors and inlets to said expansion valves, and;
   a controller coupled to each freeze barrel, each compressor, and each expansion valve;
   wherein the controller is configured to operate each compressor and each expansion valve independently in response to a chilling requirement sensed by a sensor at one or more freeze barrels.

2. A frozen product dispenser as in claim 1, wherein said at least two freeze barrels are two freeze barrels, said at least two evaporators heat transfer coupled to each freeze barrel are two evaporators heat transfer coupled to each freeze barrel, said at least two compressors are two compressors, and said controller senses the chilling requirement of each said freeze barrel and controls operation of said two compressors and said four expansion valves to selectively operate one or both of said compressors, including to selectively operate just one of said two compressors, and for each freeze barrel controls operation of said two expansion valves for evaporators heat transfer coupled to said freeze barrel to selectively operate one or both of said expansion valves, including to selectively operate of just one of said expansion valves to adjust the chilling provided by said refrigeration system to each said freeze barrel to be in accordance with the sensed chilling requirement of said freeze barrel.

3. A frozen product dispenser as in claim 1, wherein said sensor includes means for sensing the state to which product in each of said at least two freeze barrels is chilled.

4. A frozen product dispenser as in claim 1, wherein at least one freeze barrel further comprises a scraper, and wherein the sensor senses the chilling requirement by measuring an amount of electric current drawn by the scraper.

5. A refrigeration system for chilling product in at least two containers, said refrigeration system including a plurality of evaporators for being heat transfer coupled to associated ones of the containers with at least two evaporators heat transfer coupled to each container for chilling product in the containers, a plurality of controllable expansion valves each having an outlet coupled to an inlet to an associated one of said evaporators, at least two compressors connected in parallel and coupled at inlets thereto to outlets from said evaporators, and at least one condenser coupled between outlets from said at least two compressors and inlets to said expansion valves, and
   a controller coupled to one or more of said compressors, one or more of said expansion valves, and a sensor, the sensor being configured to measure a chilling requirement of at least one of said containers and communicate the chilling requirement to the sensor, the controller being configured to operate one or more of said compressors and one or more of said expansion valves in response to the chilling requirement.

6. A refrigeration system as in claim 5, wherein said sensor includes means for sensing the state to which product in each container is frozen.

7. A method of operating a frozen product dispenser having at least two product freeze barrels for receiving and chilling product and a refrigeration system for chilling the at least two freeze barrels, the refrigeration system including a plurality of evaporators heat transfer coupled to associated ones of the at least two freeze barrels with at least two evaporators heat transfer coupled to each freeze barrel for chilling product in the freeze barrels, a plurality of controllable expansion valves each having an outlet coupled to an inlet to an associated one of the evaporators, at least two compressors connected in parallel and having inlets coupled to outlets from the evaporators, and at least one condenser coupled between outlets from the at least two compressors and inlets to the expansion valves, said method comprising the steps of:

sensing the state to which product in each freeze barrel is chilled; and in response said sensing step, operating one or more of the compressors, including less than all of the compressors, and one or more of the expansion valves for the evaporators heat transfer coupled to each freeze barrel, including less than all of the expansion valves for the evaporators heat transfer coupled to any individual barrel, to adjust the chilling provided by the refrigeration system to the freeze barrels to be in accordance with the sensed state to which product therein is chilled.

8. A method as in claim 7, wherein said step of sensing the state to which product in each freeze barrel is chilled includes the step of sensing the viscosity of product in each freeze barrel.

9. A method of making a chilled product, comprising the steps of:

introducing product into at least two containers;

chilling the at least two containers to chill the product therein, said chilling step comprising the steps of:

heat transfer coupling a plurality of evaporators to the containers with at least two evaporators being heat transfer coupled to each container;

coupling each of a plurality of controllable expansion valves to an inlet to an associated one of the evaporators;

delivering refrigerant from one or more of at least two parallel connected compressors, including delivering refrigerant from less than all of the parallel connected compressors, through at least one condenser and a selected one or more of the expansion valves to the associated evaporators, including through less than all of the expansion valves for evaporators heat transfer coupled to any individual container, to adjust the chilling of a selected one or more of the containers.

10. A method according to claim 9, including the step of sensing the state to which product in that container is chilled, and controlling said delivering step in accordance with said sensing step to adjust the chilling of only those containers in which product is chilled to less than a selected state.

11. A method according to claim 9, including the step of sensing the chilling requirement of each container and controlling said delivering step in accordance with said sensing step to adjust the chilling provided to the containers.

* * * * *